US008852750B2

(12) United States Patent
Granström et al.

(10) Patent No.: US 8,852,750 B2
(45) Date of Patent: Oct. 7, 2014

(54) METHOD FOR THE COATING OF A CELLULOSE MATERIAL BY USING A GLUCAN

(75) Inventors: Mari Granström, Mannheim (DE); Stephan Freyer, Neustadt (DE); Rajan Hollmann, Bad Essen (DE); Julia Kristiane Schmidt, Heidelberg (DE); Alois Kindler, Grünstadt (DE)

(73) Assignees: Wintershall Holding GmbH (DE); BASF SE (DE)

(*) Notice: Subject to any disclaimer, the term of this patent is extended or adjusted under 35 U.S.C. 154(b) by 73 days.

(21) Appl. No.: 13/432,760

(22) Filed: Mar. 28, 2012

(65) Prior Publication Data

US 2012/0270033 A1 Oct. 25, 2012

Related U.S. Application Data

(60) Provisional application No. 61/468,586, filed on Mar. 29, 2011.

(51) Int. Cl.
*B32B 23/04* (2006.01)

(52) U.S. Cl.
USPC ......... 428/532; 428/534; 428/537.5; 427/384

(58) Field of Classification Search
USPC ................. 428/532, 534, 537.5; 427/384
See application file for complete search history.

(56) References Cited

U.S. PATENT DOCUMENTS

| 5,215,681 | A | 6/1993 | Truong et al. |
| 5,348,065 | A | 9/1994 | Meyer |
| 6,046,323 | A * | 4/2000 | Park ........................ 536/123.12 |
| 6,406,897 | B1 | 6/2002 | Kim et al. |
| 7,348,065 | B2 | 3/2008 | Ono et al. |
| 2002/0031826 | A1 | 3/2002 | Nichols |
| 2003/0157351 | A1 | 8/2003 | Swatloski et al. |
| 2009/0247486 | A1* | 10/2009 | Serizawa ........................ 514/57 |
| 2010/0081798 | A1 | 4/2010 | Balensiefer et al. |

FOREIGN PATENT DOCUMENTS

| CA | 2063490 | A1 | 9/1992 |
| CA | 1329159 | C | 5/1994 |
| DE | 4012238 | A1 | 1/1991 |
| DE | 102 02 838 | A1 | 8/2003 |
| EP | 271907 | A2 | 6/1988 |
| EP | 504673 | A1 | 9/1992 |
| EP | 1 142 591 | A1 | 10/2001 |
| EP | 1 491 682 | A1 | 12/2004 |
| EP | 1 529 820 | A1 | 5/2005 |
| JP | 2004-331758 | A | 11/2004 |
| JP | 2006-241334 | A | 9/2006 |
| WO | WO-03/008618 | A2 | 1/2003 |
| WO | WO-03016545 | A2 | 2/2003 |
| WO | WO-03029329 | A2 | 4/2003 |
| WO | WO-2008090156 | A1 | 7/2008 |

OTHER PUBLICATIONS

Fang, Y. et al., "Protein/Polysaccharide Cogel Formation Based on Gelatin and Chemically Modified Schizophyllan," *Biomacromolecules*, vol. 6, pp. 3202-3208 (2005).
Huddleston, J. et al., "Characterization and Comparison of Hydrophilic and Hydrophobic Room Temperature Ionic Liquids Incorporating the Imidazolium Cation," *Green Chemistry*, vol. 3, pp. 156-164 (2001).
Kony, D. et al., "Explicit-Solvent Molecular Dynamics Simulations of the Polysaccharide Schizophyllan in Water," *Biophysical Journal*, vol. 93, pp. 442-455 (Jul. 2007).
Marsh, K.N. et al., "Room Temperature Ionic Liquids and Their Mixtures—a Review," *Fluid Phase Equilibria*, vol. 219, pp. 93-98 (2004).
Martin, G. et al., "Adsorption of a Fungal Hydrophobin onto Surfaces as Mediated by the Associated Polysaccharide Schizophyllan," *Biopolymers*, vol. 49, pp. 621-633 (1999).
Steinbüchel, A. et al. (eds.), "Biopolymers," *Polysaccharides II: Polysaccharides from Eukaryotes*, Wiley-VCH, vol. 6., pp. 63-79 (Mar. 2002).
Swatloski, R. et al., "Dissolution of Cellose with Ionic Liquids," *Journal of the American Chemical Society*, vol. 124, pp. 4974-4975 (2002).
Wassherscheid, P. and Keim, W., "Ionische Flüssigkeiten—neue Lösungen für die Übergangsmetallkatalyse," *Angew. Chem.*, Wiley-VCH, vol. 112, pp. 3926-3945 (2000).
Zhu, S. et al., "Dissolution of Cellulose with Ionic Liquids and its Application: a Mini-Review," *Green Chemistry*, vol. 8, pp. 325-327 (2006).
International Search Report for PCT/EP2012/055510 dated Jul. 13, 2012.

* cited by examiner

*Primary Examiner* — Leszek Kiliman
(74) *Attorney, Agent, or Firm* — Drinker Biddle & Reath LLP

(57) ABSTRACT

The present invention is directed to a method for coating a sheet-like cellulose containing material by applying a composition comprising at least one glucan (G), which has a β(beta)-1,3-glycosidically linked main chain and at least one side group having a β(beta)-1,6-glycosidic bond to the main chain, particularly Schizophyllan, and at least one solvent (S), particularly a ionic liquid, on the surface of the sheet-like material.

14 Claims, 1 Drawing Sheet

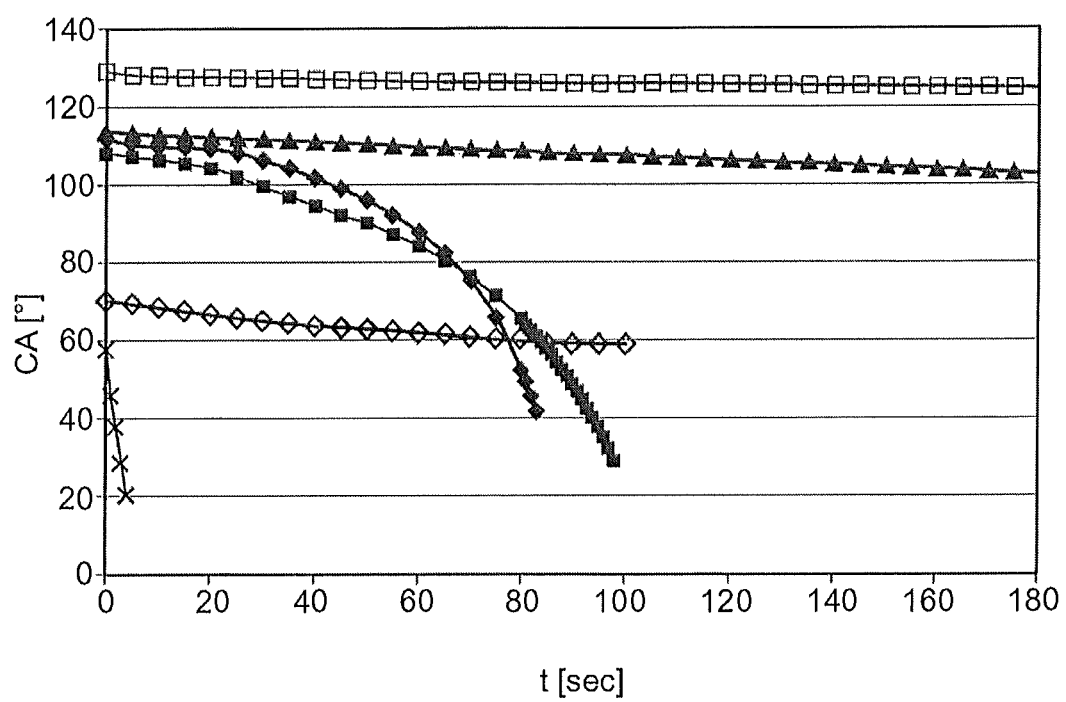

METHOD FOR THE COATING OF A CELLULOSE MATERIAL BY USING A GLUCAN

CROSS-REFERENCE TO RELATED APPLICATIONS

This application claims the benefit of U.S. Provisional Application 61/468,586, filed Mar. 29, 2011, which is incorporated by reference.

BACKGROUND OF THE INVENTION

The present invention relates to a method for coating of a sheet-like cellulose material, such as paper or cotton fabric, by applying a composition comprising at least one glucan having a β(beta)-1,3-glycosidically linked main chain and at least one side group having a β(beta)-1,6-glycosidic bond to the main chain. One preferred glucan is Schizophyllan. The composition often comprises at least one solvent and can be applied onto the surface of the cellulosic material. The invention is further directed to a coated sheet-like cellulosic material.

Furthermore, the present invention is directed to a composition comprising at least one glucan, particularly Schizophyllan, and at least one ionic liquid.

Paper and paper products (e.g. board) are known for their hydrophilic properties which can be regarded as a disadvantage in many application areas. Often the paper surface is treated by coating or sizing in order to improve the hydrophobic properties and quality of the paper (e.g. printability, dimensional stability). The so called "sizing" renders the paper surface more hydrophobic and prevents or delays the penetration of water and ensures dimensional stability. This is important for all types of printing paper but also for packing paper and board. Commonly used "sizing agents" are for example rosin size, alkyl ketendimer (AKD) and alkenyl succinic anhydrid (ASA).

For ecological and economic reasons, there is a strong interest in bio-based coatings for paper in order to enhance the barrier properties against water and oil and thereby to broaden the application areas of paper and paper products in which hydrophobic or even highly hydrophobic surfaces are needed.

It is commonly known in the state of art that several glucan compounds, such as starch, can be used in coating and sizing of paper. The document U.S. Pat. No. 7,348,065 describes a coated paper with improved slipping properties, wherein the coating comprises a olefin-carboxylic acid copolymer and a second polymer selected from starch, cellulose, polyvinyl alcohol, polyacrylamide or sodium alginate.

U.S. Pat. No. 5,348,065 discloses a process for the treatment of paper using a degradation product which is a mixture of oligomers of a polysaccharide derivative, such as carboxymethyl cellulose or carboxymethyl starch, wherein the treatment can for example encompass impregnating of pulp or coating of a paper product.

Generally, polysaccharides consisting of many glucose units (D-glucose) are referred to as glucans. Common glucans are e. g. cellulose and starch. Cellulose essentially consists of glucose units, which are linked β(beta)-1,4-glycosidically. Starch essentially consists of glucose units, which are linked α(alpha)-1,4-glycosidically and optionally have α(alpha)-1,6-glycosidic linked side chains.

Glucans which have a β(beta)-1,3-glycosidically linked main chain and side groups, having a β(beta)-1,6-glycosidic bond to the main chain are secreted by various fungal strains. For example, the so called "Schizophyllan" is produced by the fungus *Schizophyllum commune*, a basidiomycete, which exhibits filamentous growth and secretes during growth inter alia said glucan product. Aqueous solutions of such polysaccharides exhibit advantageous physiochemical properties (e.g. high viscosity, stability to high shear rates, stability to high temperatures and to high salt concentrations).

In addition to Schizophyllan, the organism *Schizophyllum commune* secretes other major biopolymers into a liquid growth media, namely the peptide hydrophobin (24 kDa) and a further protein (17 kDa), which is also found in the fungal cell wall.

Commonly, Schizophyllan can be described as a polysaccharide with repeating units consisting of three β(beta)-1,3-linked D-glucose units as a backbone, one of which is linked to single D-glucose molecule through β(beta)-1,6-linkage.

The structure of the repeating unit of Schizophyllan can be described by the following formula:

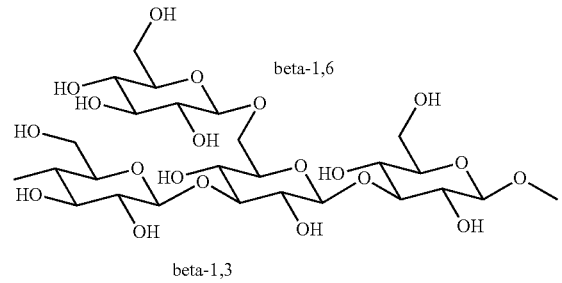

The typically molecular weight $M_w$ of Schizophyllan is in the range of about $5\cdot10^6$ to about $25\cdot10^6$ g/mol.

The preparation of said glucans by fermentation with the fungus *Schizophyllum commune* is for example described in EP-A 271 907, EP-A 504 673 and DE-A 40 12 238.

Another example for glucans which have a β(beta)-1,3-glycosidically linked main chain and side groups having a β(beta)-1,6-glycosidic bond, are the so called homo-polysaccaride "Sceleroglucan", which is e.g. secreted by the fungus *Sclerotium rolfsii*.

Many fungal stains secreting said glucans are known to the skilled person. Examples comprise *Schizophyllum commune, Sclerotium rolfsii, Sclerotium glucanicum, Monilinia fructigena, Lentinula edodes* or *Botrytis cinera*. Glucan producing fungal strains are further described in EP-A 271 907 and EP-A 504 673.

Schizophyllan generally has a network structure and high molecular weight and hence can for example be used in applications in which high viscosities and/or increased binding is needed. Schizophyllan has been extensively studied as a viscosity-control agent (Fang et al., Biomacromolecules, 2005, 6, 3202; Kony et al., Biophys. J., 2007, 93,442).

The publication G. Martin et al., Biopolymers, 1999, 49, 621 describes that the fungal protein hydrophobin and also the fungal culture supernatant of *Schizophyllum commune* comprising hydrophobin and Schizophyllan can form a stable coating on both hydrophobic and hydrophilic surfaces.

U.S. Pat. No. 5,215,681 describes concentrated liquid solutions of polysaccharides prepared by ultra-filtration of a dilute solution of polymer to which a surface-active agent has been added. The polysaccharide can for example be Sceleroglucan or Schizophyllan. These solutions can be used as thickening agent, e.g. in the recovery of hydrocarbons.

Other applications include carriers for metals and pollutants in natural water and the stimulation of the human immune system. Schizophyllan is normally reported to have a high stability (up to 120° C. in aqueous solution), high water solubility and poor gelling ability. It is also known for its non-toxic and biocompatible nature. In addition, Schizophyllan has been reported to form brittle and weak gels and to be used in fabrication of nano-fibre structures.

BRIEF DESCRIPTION OF THE DRAWINGS

FIG. 1 shows the time-dependent contact angles (CA) of basic papers and of Schizophyllan coated papers by using water droplets.

DETAILED DESCRIPTION OF THE INVENTION

It is one object of the present invention to provide a novel hydrophobic coated cellulose material with a highly packed, non-porous coating resulting in an increased impermeability for both water and oil. This coating should further be bio-based and preferably biodegradable. These coated cellulose containing materials can for example be applied in food packing materials or as textile materials.

It was surprisingly found, that a hydrophobic film of Schizophyllan in particular a film with nearly none porosity, on a cellulose material, such as paper, can be obtained. It seems that due to the network-like structure of Schizophyllan, a highly packed film without porosity can be obtained.

The present invention relates to a method for coating a sheet-like cellulose containing material by applying a composition comprising at least one glucan (G), which has a β(beta)-1,3-glycosidically linked main chain and at least one side group, having a β(beta)-1,6-glycosidic bond to the main chain, and at least one solvent (S) onto the surface of the sheet-like material. Preferably, the at least one glucan (G) is Schizophyllan.

The hydrophobic properties of paper can be increased by blocking the penetration of water. Further, this novel coated cellulosic material shows an enhanced blocking of the penetration of oil and other hydrophobic compounds. It was found, that Schizophyllan can be used as purely bio-based coating for paper products and enhances the properties of the paper products by providing hydrophobic character, which is an important property for paper products in several applications.

The novel Schizophyllan coating (e.g. Schizophyllan film) applied onto cellulose containing materials exhibits surprisingly hydrophobic surface properties. The novel coating method provides a method to increase the hydrophobic properties of e. g. paper. It can block the penetration of water droplets into the paper surface. The novel films can also be characterized by their high stability and excellent adhesion properties.

It is a further advantage, that Schizophyllan is a fully bio-based polymer, using renewable resources and originating from a natural, biological process. Thus, the novel coating compositions according to the present invention can be regarded as fully bio-based, more particularly from 40 to 99% bio-based, preferably 40 to 90% bio-based.

In order to understand the properties of Schizophyllan, some structural investigations were carried out. A particularly interesting structural feature of Schizophyllan seems to be the reversible and solvent-induced structural transition between a triple-stranded helical structure in water and the individual single-strands (random coil) in solvents such as DMSO and/or sodium hydroxide (NaOH).

In terms of the present invention "coating" means covering the surface of a material with a layer, particularly a thin film. This thin layer can have a thickness of e. g. 0.1 to 1,000 micrometers (μm), preferably 0.1 to 500 micrometers, preferably 0.5 to 500 micrometers, and can e. g. comprise other components such as filler. The coating applied by the composition can also essentially consist of at least one glucan.

In terms of the present invention "glucan" is understood as meaning homopolysaccharides which are composed exclusively (if applicable aside from end groups) of glucose units (D-Glucose). The glucans which have a β(beta)-1,3-glycosidically linked main chain and side groups having a β(beta)-1,6-glycosidic bond, are understood as comprising a main chain of β(beta)-1,3-glycosidically linked glucose units and at least one side group having a β(beta)-1,6-glycosidic bond to the main chain and wherein the side group(s) comprise(s) at least one glucose units.

Preferably the composition comprises at least one glucan (G) which have a β(beta)-1,3-glycosidically linked main chain and at least one side group having a β(beta)-1,6-glycosidic bond to the main chain, wherein the side group(s) consist of a single β-1,6-glycosidically bonded glucose unit. Preferably—in statistical terms—every third unit of the main chain have a β-1,6-glycosidic linkage to a further side group. More preferably the used glucan (G) have a main chain wherein—in statistical terms—every third unit of the main chain have a β-1,6-glycosidic linkage to a single glucose unit. Typically, the molecular weight $M_w$ of Schizophyllan used in the present invention is in the range of about $5·10^6$ to about $25·10^6$ g/mol.

Preferably, the at least one glucan is Sceleroglucan and/or Schizophyllan, preferably Schizophyllan. More preferably Sceleroglucan and/or Schizophyllan, preferably Schizophyllan, are or is used as sole glucan-component (G).

The glucan (G) used in the method for coating can in particular be prepared by using fungal strains secreting the glucan, for example fungal strains selected from *Schizophyllum commune, Sclerotium rolfsii, Sclerotium glucanicum, Monilinia fructigena, Lentinula edodes* and *Botrytis cinera*. Suitable fungal strains are furthermore mentioned, for example, in EP-A 271 907 and EP-A 504 673. Preferably, the glucan can be prepared by using the fungal strains *Schizophyllum commune* or *Sclerotium rolfsii* and more preferably *Schizophyllum commune*.

Various processes for the fermentation of such fungal strains are known to the person skilled in the art. These processes are for example described in EP-A 271 907, EP-A 504 673, DE-A 40 12 238 and WO 2003/016545, which in each case also mention suitable culture media. Generally, in a first process step, the fungi are cultivated in a suitable aqueous culture medium. In the course of the cultivation, also known as fermentation, the fungi secrete the above mentioned class of glucan into the aqueous fermentation broth. The fungi can be cultured, for example, in an aqueous culture medium at a temperature of from 15° C. to 40° C.

In particular, the glucan (G) is present in the composition in an amount of 0.1 to 30% w/w, preferably from 0.1 to 10% w/w, more preferably from 0.1 to 5% w/w, often from 0.1 to 1% w/w based on the overall composition.

In one embodiment of the invention, the composition comprises at least one solvent (S). This solvent often is a polar solvent, preferably selected from the group consisting of water; alcohols, preferably $C_{1-6}$ alcohol (preferably methanol, ethanol, isopropanol, butanol); glycols (preferably butyl monoglycol, butyl diglycol, butyl triglycol), ethers (preferably dimethyl ether, diethyl ether, dipropyl ether, methylethyl ether, methylpropyl ether, ethylpropyl ether; glycol ether), esters (preferably ethyl acetate, n-butyl acetate, propylene based glycol esters) and ionic liquids.

In a preferred embodiment, the solvent (S) comprises water. Preferably, the at least one solvent (S) is water.

In a preferred embodiment the invention relates to a method of coating, wherein at least one ionic liquid is used as solvent (S). Preferably, an ionic liquid (or a mixture of two or more different ionic liquids) is used as sole solvent (S).

Suitable solvents (S) may also be mixtures or combinations of the solvents mentioned above. "Solvent" in term of the present invention can be understood as solvent (in terms of molecular solutions, colloidal solutions, micro dispersions or gels) and/or as swelling agent.

Preferably the solvent (S) is present in the composition in the range of 70 to 99.9% w/w, preferably from 90 to 99.9% w/w, often from 95 to 99.9% w/w, based on the overall composition.

The composition may comprise at least one further additive (A), such as a filler (e.g. calcium carbonate, grounded calcium carbonate (GCC), precipitated calcium carbonate (PCC), china clay and titanium dioxide), dye, optical brightener, polymeric binders, surfactants, sizing agents such as alkylketene dimer (AKD), alkenylsuccinic anhydride (ASA), rosin.

Typically the additive (A) is present in the composition in the range of 0 to 15% w/w based on the overall composition. Preferably, the additive (A) is present in relation to glucan (G) in the range of 0 to 50% w/w, preferably from 0 to 30% w/w, more preferably from 0.1 to 10% w/w.

Preference is given to a method for coating a sheet-like cellulose containing material by applying a composition comprising at least one glucan (G), wherein the composition comprises (or consists of):

- 70 to 99.9% w/w (based on the overall composition), particularly 70 to 85% w/w of at least one solvent (S), (preferably water and/or at least one ionic liquid),
- 0.1 to 30% w/w (based on the overall composition) of at least one glucan (G), (preferably Schizophyllan and)
- optionally 0 to 15% w/w, in particular 0.1 to 15% w/w, (based on the overall composition) of at least one further additive (A).

The sum of amounts of components of the composition given in % w/w (weight percent) based on the overall composition does not exceed 100%.

It is known from the state of the art that various ionic liquids can be used as solvents for polysaccharides such as cellulose. Thus, the scientific publications S. Zhu et al. in Green Chem. 2006, 8, 325-327 and R. Swatloski et al. in J. Am. Chem. Soc. 2002, 124, 4974-4975 describe in general terms the possibility of dissolving cellulose in ionic liquids and recovering it by addition of suitable precipitates such as water, ethanol, or acetone. As suitable ionic liquids, specific mention is made of 1-butyl-3-methylimidazolium chloride (BMIMCl) and 1-allyl-3-methylimidazolium chloride (AMIMCl). Furthermore, the dissolution of cellulose using ionic liquids is for example described in US-A 2003/0157351.

WO 2003/029329 describes a method for dissolving cellulose by admixing cellulose with a molten ionic liquid, e.g. with small cations and halide or pseudohalide anions, in the absence of water or a nitrogen. WO 2008/090156 relates to a method for producing glucose by enzymatic hydrolysis of cellulose that is obtained from a material containing lignocellulose using an ionic liquid that comprises a polyatomic anion.

For the purposes of the present patent application, ionic liquids are organic salts which are liquid at temperatures below 180° C. The ionic liquids preferably have melting points of less than 150° C., preferably less than 100° C., more preferably less than 20° C. Ionic liquids which are present in the liquid state even at room temperature are described, for example, by K. N. Marsh et al., Fluid Phase Equilibria 219 (2004), 93-98 and J. G. Huddleston et al., Green Chemistry, 2001, 3, 156-164.

Normally, cations and anions are present in the ionic liquid. It can be possible for a proton or an alkyl radical to be transferred from the cation to the anion within the ionic liquid, resulting in two uncharged molecules.

Thus, equilibrium between anions, cations and uncharged molecules can be present in the ionic liquid used according to the present invention. The ionic liquids used according to the invention have polyatomic, i.e. multi-atomic anions having two or more than two atoms. In principle, all ionic liquids based on multi-atomic anions are suitable for use in the method of the present invention. Suitable ionic liquids are for example described in WO 2008/090156.

Preferred ionic liquids are:

a) salts of the general formula (I)

where n is 1, 2, 3 or 4, $[A]^+$ is a quaternary ammonium cation, an oxonium cation, a sulfonium cation or a phosphonium cation and $[Y]^{n-}$ is a multiatomic, monovalent, divalent, trivalent or tetravalent anion or a mixture of these anions;

b) mixed salts of the general formulae (II)

where n=2,

where n=3,

where n=4, where $[A^1]^+$, $[A^2]^+$, $[A^3]^+$ and $[A^4]^+$ are selected independently from among the groups mentioned for $[A]+$ and $[Y]^{n-}$ is as defined under a)

c) mixed salts of the general formulae (III)

where n=4,

where n=4,

where n=4,

where n=3,

where n=3,

where n=2,

where n=4,

where n=4,

where n=4,

where n=3,
where $[A^1]^+$, $[A^2]^+$, and $[A^3]^+$ are selected independently from among the groups mentioned for $[A^1]^+$, $[Y]^{n-}$ is as defined under a) and $[M^1]^+$, $[M^2]^+$, and $[M^3]$ are monovalent metal cations, $[M^4]^{2+}$ is a divalent metal cation and $[M^5]^{3+}$ is a trivalent metal cation. The metal cations $[M^1]^+$, $[M^2]^+$, $[M^3]^+$, $[M^3]^{2+}$ and $[M^5]^{3+}$ in the formulae (III.a) to (III.j) are generally metal cations of groups 1, 2, 6, 7, 8, 9, 10, 11, 12, 13 and 14 of the Periodic Table. Suitable metal cations are, for example, Li+, Na+, K+, Cs+, Ag+, $Mg^{2+}$, $Ca^{2+}$, $Ba^{2+}$, $Cr^{3+}$, $Fe^{2+}$, $Fe^{3+}$, $Co^{2+}$, $Ni^{2+}$, $Cu^{2+}$, $Zn^{2+}$ and $Al^{3+}$.

Preference is given to salts of groups A and B, particularly group A.

Suitable ionic liquids according to formulae (I), (II) and (III) are described in WO 2008/090156. Compounds which are suitable for forming the cation $[A]^+$ of ionic liquids are described in DE-A 102 02 838. These compounds preferably comprise at least one heteroatom, e.g. from 1 to 10 heteroatoms, which is/are preferably selected from among nitrogen, oxygen, phosphorus and sulphur atoms. Preference is given to compounds which comprise at least one nitrogen atom and, if appropriate, additionally at least one further heteroatom which is different from nitrogen. Preference is given to compounds which comprise at least one nitrogen atom, particularly preferably from 1 to 10 nitrogen atoms, in particular from 1 to 5 nitrogen atoms, very particularly preferably from 1 to 3 nitrogen atoms and especially 1 or 2 nitrogen atoms. The latter nitrogen compounds can comprise further heteroatoms such as oxygen, sulphur or phosphorus atoms.

The nitrogen atom is, for example, a suitable carrier of the positive charge in the cation of the ionic liquid. If the nitrogen atom is the carrier of the positive charge in the cation of the ionic liquid, a cation can firstly be produced by quaternization of the nitrogen atom of, for instance, an amine or nitrogen heterocycle in the synthesis of the ionic liquids. Quaternization can be effected by protonation of the nitrogen atom. Depending on the protonation reagent used, salts having different anions are obtained. In cases in which it is not possible to form the desired anion in the quaternization itself, this can be brought about in a further step of the synthesis. Starting from, for example, an ammonium halide, the halide can be reacted with a Lewis acid to form a complex anion from the halide and Lewis acid. As an alternative, replacement of a halide ion by the desired anion is possible. This can be achieved by addition of a metal salt with precipitation of the metal halide formed, by means of an ion exchanger or by displacement of the halide ion by a strong acid (with liberation of the hydrogen halide). Suitable methods are described, for example, in Angew. Chem. 2000, 112, pp. 3926-3945, and the references cited therein.

Preference is given to compounds which comprise at least one five- or six-membered heterocycle, in particular a five-membered heterocycle, which has at least one nitrogen atom and, if appropriate, an oxygen or sulfur atom. Particular preference is given to compounds which comprise at least one five- or six-membered heterocycle having one, two or three nitrogen atoms and a sulfur or oxygen atom, very particularly preferably compounds having two nitrogen atoms. Further preference is given to aromatic heterocycles.

Particularly preferred compounds are compounds which have a molar mass of less than 1000 g/mol, very particularly preferably less than 800 g/mol and in particular less than 500 g/mol.

Preferred cations $[A]^+$ are selected from the heterocyclic compounds such as pyridinium ions, pyridazinium ions, pyrimidinium ions, imidazolium ions, pyrazolium ions, imidazolinium ions, thiazolium ions, oxazolium ions, pyrrolidinium ions, imidazolidinium ions, ammonium ions, guanidinium ions, cholinium ions, phosphonium ions and sulfoniumions described in WO2008/090156.

Particularly useful imidazolium ions are 1-methylimidazolium, 1-ethylimidazolium, 1-(1-propyl)imidazolium, 1-(1-allyl)imidazolium, 1-(1-butyl)imidazolium, 1-(1-octyl)-imidazolium, 1-(1-dodecyl)imidazolium, 1-(1-tetradecyl) imidazolium, 1-(1-hexadecyl)-imidazolium, 1,3-dimethylimidazolium, 1,3-diethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octyl-imidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-methylimidazolium, 3-ethylimidazolium, 3-n-propylimidazolium, 3-n-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium, 1-prop-1-en-3-yl-3-methylimidazolium and 1-prop-1-en-3-yl-3-butylimidazolium.

Especially useful imidazolium ions are 1,3-diethylimidazolium, 1-ethyl-3-methylimidazolium, 1-(n-butyl)-3-methylimidazolium.

Preferred tertiary amines are diisopropylethylamine, diethyl-tert-butylamine, diisopropylbutylamine, di-n-butyl-n-pentylamine, N,N-di-n-butylcyclohexylamine and tertiary amines derived from pentyl isomers.

Particularly preferred tertiary amines are di-n-butyl-n-pentylamine and tertiary amines derived from pentyl isomers. A further preferred tertiary amine which has three identical radicals is triallylamine.

Examples of tertiary amines from which the quaternary ammonium ions are derived by quaternization with $C_{1-18}$ alkyl are diethyl-n-butylamine, diethyl-tert-butylamine, diethyl-n-pentylamine, diethylhexylamine, diethyloctylamine, diethyl-(2-ethylhexyl)amine, di-n-propylbutylamine, di-n-propyl-n-pentylamine, di-n-propylhexylamine, di-n-propyloctylamine, di-n-propyl-(2-ethylhexyl)amine, diisopropylethylamine, diisopropyl-n-propylamine, diisopropyl-butylamine, diisopropylpentylamine, diisopropylhexylamine, diisopropyloctylamine, diisopropyl-(2-ethylhexyl)amine, di-n-butylethylamine, di-n-butyl-n-propylamine, di-n-butyl-n-pentylamine, di-n-butylhexylamine, di-n-butyloctylamine, di-n-butyl-(2-ethylhexyl)amine, N-n-butylpyrrolidine, N-sec-butylpyrrolidine, N-tert-butylpyrrolidine, N-n-pentylpyrrolidine, N,N-dimethylcyclohexylamine, N,N-diethylcyclohexylamine, N,N-di-n-butylcyclohexylamine, N-n-propylpiperidine, N-isopropylpiperidine, N-n-butyl-piperidine, N-sec-butylpiperidine, N-tert-butylpiperidine, N-n-pentylpiperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n-butyl-p-toluidine, diethylbenzylamine, di-n-propylbenzylamine, di-n-butylbenzylamine, diethylphenylamine, di-n-propylphenylamine and di-n-butylphenylamine.

A particularly preferred guanidinium ion is N,N,N',N',N'',N''-hexamethylguanidinium.

The cation $[A]^+$ are particularly selected from among cations of 1,5-diazabicyclo[4.3.0]non-5-ene (DBN) and 1,8-diazabicyclo[5.4.0]undec-7-ene (DBU).

Among the abovementioned heterocyclic cations, the imidazolium ions, imidazolinium ions, pyridinium ions, pyrazolinium ions and pyrazolium ions are preferred. Particular preference is given to the imidazolium ions and cations of DBU and DBN.

As anions, it is in principle possible to use all polyatomic anions, i.e. multi-atomic anions (anions having two or more atoms).

Preferred anions $[Y]^{n-}$ are selected from pseudohalides and halogen-comprising compounds, sulfates, sulphites, sulfonates, phosphates, phosphonates, phosphites, anions of hydroxycarboxylic acids, sugar acids, saccharinates (salts of o-benzoic sulfimide), borates, carbonates, carbonic esters, silicates, salicic esters, carboxylmides, bis(sulfonyl)imides, sulfonylimides, methides, alkoxides, aryloxides, hydrogensulfides, polysulfides, hydrogen-polysulfides and thiolates as described in WO2008/090156.

The anion $[Y]^{n-}$ of the ionic liquid is, for example, selected from the group of pseudohalides and halogen-comprising compounds of the formulae: $BF_4^-$, $PF_6^-$, $CF_3SO_3^-$, $(CF_3SO_3)_2N^-$, $CF_3CO_2^-$, $CCl_3CO_2^-$, $CN^-$, $SCN^-$, $OCN^-$.

Preferred anions are, for example, selected from the group of pseudohalides and halogen-comprising compounds, the group of carboxylic acids, the group of sulfates, sulfites and sulfonates and the group of phosphates.

Preferred anions $[Y]n^-$ are formate, acetate, propionate, butyrate, lactate, saccharinate, carbonate, hydrogencarbonate, sulfate, sulfite, C1-C4-alkylsulfates, methanesulfonate, tosylate, trifluoroacetate, C1-C4-dialkylphosphates and hydrogensulfate. Particularly preferred anions are selected from the group consisting of formate ($HCOO^-$), acetate ($CH_3COO^-$), propanoate ($CH_3CH_2COO^-$), carbonate, hydrogencarbonate, sulfate, sulfite, tosylate, methyl sulfonate ($CH_3SO_3^-$) and methoxy sulfonate ($CH_3OSO_3^-$).

Most preferred, the anion $[Y]^{n-}$ is acetate ($CH_3COO^-$).

Suitable ionic liquids for use in the process of the invention are commercially available, e.g. under the trade name Basionic® from BASF Aktiengesellschaft. Examples of commercially available ionic liquids which can be advantageously used in the process of the invention are 1-ethyl-3-methylimidazolium methanesulfonate (EMIM $CH_3SO_3$, Basionic ST 35), 1-butyl-3-methylimidazolium methanesulfonate (BMIM $CH_3SO_3$, Basionic ST 78), methylimidazolium hydrogensulfate (HMIM $HSO_4$ Basionic AC 39), 1-ethyl-3-methylimidazolium hydrogensulfate (EMIM $HSO_4$ Basionic AC 25), 1-butyl-3-methylimidazolium hydrogensulfate (BMIM $HSO_4$ Basionic AC 28) 1-ethyl-3-methylimidazolium acetate (EMIM Acetat, Basionic BC 01), 1-butyl-3-methylimidazolium acetate (BMIM Acetat, Basionic BC 02).

Particular preference is given to 1-ethyl-3-methylimidazolium acetate (EMIM), 1,3-diethylimidazolium acetate and 1-butyl-3-methylimidazolium acetate.

Preferably the present invention is directed to a method of coating a sheet-like cellulose containing material as described above comprising the following steps:
 a) Preparing a composition comprising at least one glucan (G) and at least one solvent (S), preferably a ionic liquid;
 b) Applying the composition obtained in step a) onto a sheet-like cellulose containing material by forming a film;
 c) Optionally drying the film.

In one preferred embodiment of the present invention a composition comprising at least one glucan (G) and at least one ionic liquid as solvent (S) is applied onto the sheet-like cellulosic material. Preferably, the glucan (G) is dissolved in the ionic liquid.

For the purposes of the invention the term "dissolved" ("solution" or "solubilization") refers to a conversion into a liquid state and comprises the production of solutions of the glucan material and also conversion into a different solubilized state. If a glucan material is converted into a solubilized state, the individual polymer molecules do not necessarily have to be completely surrounded by a solvation shell. The important thing is that the glucan goes into a liquid state as a result of the solubilization. Solubilizates within the meaning of the invention thus also include colloidal solutions, microdispersions, gels, etc. If undissolved material remains, this often is not critical to the success of the method for coating of the present invention.

The composition can be applied onto the sheet-like cellulose containing material using methods, which are in principle known by a skilled person. Preferably the composition is applied using methods selected from dipping, spraying, rolling, squeezing and coating with a blade. Preferably the composition is applied with a blade. Applying the composition can be carried out using at least one of known sizing or coating devices, e.g. blade coater, air knife, bar coater, size press, film press, trailing blade, bill blade, inverted blade and roller blade.

The glucan film, preferably the Schizophyllan film, can be obtained by directly applying said composition to the sheet-like material, e.g. using one of the above mentioned coating methods.

In another embodiment, the glucan film is firstly formed on a transfer material using one of the above mentioned application methods and/or devices, after that the film can be transferred onto the sheet-like cellulose containing material.

Said transfer material is preferably a hydrophobic polymeric material (e.g. a polymer foil), such as polyethylene, polypropylene, polybutylene, polysiloxane, Teflon®, and Gore-tex®.

Particularly, the present invention is directed to a method of coating a sheet-like cellulose containing material as described above, wherein applying the composition onto the sheet-like cellulose containing material is carried out by the following steps:
 b1) Applying the composition comprising at least one glucan (G) and at least one solvent (S) onto a hydrophobic transfer material by forming a film; whereby the transfer material preferably comprises (or consisting of) a polymer selected from polyethylene, polypropylene, polybutylene, polysiloxane, Teflon®, and Goretex®;
 b2) Optionally exposing the film obtained in step b1) to at least one solvent (S), preferably $C_{1-6}$ alcohol, preferably ethanol;
 b3) Transferring the film obtained in step b2) onto the cellulose containing sheet-like material, preferably by rolling and/or squeezing.

The obtained film can be exposed to at least one solvent (S) (step b2), preferably selected from water; alcohol (preferably $C_{1-6}$ alcohol, preferably methanol, ethanol, isopropanol, butanol), glycol (preferably butyl monoglycol, butyl diglycol, butyl triglycol), ether (preferably dimethyl ether, diethyl ether, dipropyl ether, methylethyl ether, methylpropyl ether, ethylpropyl ether, glycol ether) and ester (preferably ethyl acetate, n-butyl acetate, propylene based glycol esters) or mixtures of said solvents, more preferably $C_{1-6}$ alcohol, more preferably ethanol. In particular the ionic liquid is removed partially or nearly completely from the film in this step.

Preferably, transferring the film from the transfer material onto the sheet-like cellulose containing material can be carried out by laying the transfer material with the glucan film onto the sheet-like material, wherein the film side is placed towards the cellulose containing material, and rolling and/or squeezing the materials.

Optionally, the transfer material is removed from the film after step b3).

The glucan film can also be a stable free-standing film. In one embodiment of the invention the glucan film obtained in step b1) and/or step b2) can be separated from the transfer material, preferably by peeling off the glucan film from the transfer material. The present invention is directed to a method of coating as described above, wherein the film is separated from the transfer material and afterwards transferred onto the sheet-like cellulose containing material. Optional the glucans film can be dried before or after separation from transfer material.

In this aspect the present invention is directed to a method of producing a glucan film comprising the following steps:
  i) Applying a composition comprising at least one glucan (G), which has a β(beta)-1,3-glycosidically linked main chain and at least one side group having a β(beta)-1,6-glycosidic bond to the main chain, and at least one solvent (S), preferably at least one ionic liquid, onto a hydrophobic transfer material by forming a glucan film; whereby the transfer material preferably comprises (or consisting of) a polymer selected from polyethylene, polypropylene, polybutylene, polysiloxane, Teflon® and Goretex®;
  ii) Optional exposing the obtained glucan film to at least one solvent (S), preferably $C_{1-6}$ alcohol, more preferably ethanol;
  iii) Separating the obtained glucan film from the transfer material, preferably by peeling off the glucan film from the transfer material;
  iv) Optional drying the obtained glucan film.

Further on, the present invention is directed to a free-standing film comprising or essentially consisting of a glucan (G), which has a β(beta)-1,3-glycosidically linked main chain and at least one side group having a β(beta)-1,6-glycosidic bond to the main chain. Preferably, the present invention is directed to a free-standing Schizophyllan film. The present invention is directed to a glucan film obtainable by a method of producing a glucan film as described above.

In particular the sheet-like cellulose containing material is selected from paper, board, construction paper and cotton fabric. Preferably the present invention is directed to a method, wherein the cellulose containing sheet-like material is selected from paper, board, construction paper and cotton fabric and wherein the coating results in a coating layer of film thickness in the range of 1 to 1,000 μm, preferably 10 to 200 μm, more preferably 1 to 100 μm.

"Paper" or "paper product" in terms of the present invention means sheet-like materials of fibers, particularly of mechanical or chemical treated plant fibers, wherein the paper is normally build up by dewatering of fiber suspension using a sieve, particularly under addition of further additives such as filler, dye or sizing agents. "Paper" or "product of paper" in terms of the present invention can be understood as graphic paper (e.g. printing paper), packing paper (e.g. board, corrugated board), household and sanitary papers and specialty paper. Paper products can be characterizes by their site-related weight. According to DIN 6730 paper normally has a site-related weight in the range of less or equal than 225 $g/m^2$, board has a site-related weight of more than 225 $g/m^2$.

The resulting coating layer has preferably a film thickness in the range of 1 to 1,000 μm, preferably 10 to 200 μm, more preferably 1 to 100 μm.

Furthermore, the present invention is directed to a composition comprising:
  i) at least one glucan (G), which have a β(beta)-1,3-glycosidically linked main chain and at least one side group having a β(beta)-1,6-glycosidic bond to the main chain, preferably Schizophyllan and/or Sceleroglucan, most preferred Schizophyllan;
  ii) at least one ionic liquid; and
  iii) optional at least one further additive (A).

Particular preference is given to the component (glucan (G), solvent (S), additive (A)) as described above in connection with the method for coating.

Preferably the composition comprises at least one liquid selected from 1-ethyl-3-methylimidazolium acetate (EMIM), 1,3-diethylimidazolium acetate and 1-butyl-3-methylimidazolium acetate.

In particular the amount of Glucan (G), preferably Schizophyllan, is in the range of 0.1 to 30% w/w, preferably 0.1 to 10, more preferably 0.1 to 5% w/w, most preferably 0.1 to 3% w/w (based on the overall composition).

Furthermore, the present invention is directed to a coated sheet-like cellulose containing material comprising a coating layer, which comprises at least one glucan, which have a β(beta)-1,3-glycosidically linked main chain and at least one side group having a β(beta)-1,6-glycosidic bond to the main chain. Preference is given to glucan (G) mentioned above in connection with the method of coating, particularly the coating layer comprises (preferably essentially consists of) Schizophyllan and/or Sceleroglucan, preferably Schizophyllan.

Preferably the sheet-like material comprises a coating layer having a thickness in the range of 1 to 1,000 micrometer (μm), preferably 10 to 200 μm, more preferably 1 to 100 μm.

The present invention is further directed to a sheet-like cellulose containing material comprising a coating layer obtainable by a method described above.

Preferably the coated sheet-like cellulose containing material exhibits a hydrophobic surface. Hydrophobic surface or hydrophobic coating in terms of the present invention means that surface exhibits a contact angle (CA) values measured against water higher than 100°, wherein the contact angle higher than 100° is stable for at least 60 sec, preferably for at least 100 sec, more preferably for at least 180 sec.

Furthermore, the present invention relates to the use of said coated sheet-like cellulose containing material as packing material for food, e.g. all kind of hydrophobic surface paper and paper products, e.g. coffee cup, paper plate, sandwich paper.

Further, the present invention relates to the use of a glucan, which have a β(beta)-1,3-glycosidically linked main chain and at least one side group having a β(beta)-1,6-glycosidic bond to the main chain, for coating a sheet-like cellulose containing material, preferably a paper product. Preference is given to the use of glucan as described above, in particular to the use of Schizophyllan.

The present invention is described in more detail by the following examples.

Example 1

Preparation of Schizophyllan

*Schizophyllum commune* was used for the experiments, i.e. the Schizophyllan as described in "Udo Rau, Biopolymers, Editor A. Steinbüchel, WILEY-VCH Publishers, 2002, Volume 6, pages 63 to 79" was prepared in a batch fermentation. The fermentation time was about 96 hours. 99.6 kg of this fermentation broth (=feed) was introduced into a container and circulated for 45 minutes at 4 bar pressure at a circulation rate of 7 m$^3$/h by means of a pump. The content of the container was analyzed and a content of 9.8 grams of Schizophyllan per liter was determined.

The circulation rate was then set to 5.1 m$^3$/h and a transmembrane pressure of 1.1 bar applied. The transmembrane flow rate was 5 m/s. The permeate emerging from the filter modules was collected and weighed. During the first 10 minutes of the experiment, 0.75 kg of permeate was obtained. This corresponds to a permeate flow of 20.4 kg/h/m2. The transmembrane pressure was 2.9 bar. The filtration was operated for 16 hours.

The glucan content was determined as 8.97 g/l glucans. Fungal proteins particularly hydrophobin has not been detected in the used purified fermentation broth.

Example 2

Isolation and Characterization of Schizophyllan

Aqueous solutions as obtained in Example 1 with concentrations of 4 and 8.97 g/l glucan content were poured in ethanol to precipitate Schizophyllan.

The precipitation was filtered and dried either in a vacuum oven or freeze-dried. Semi-dried gel-like material was obtained drying the material in air. Structural investigations were carried out either on oven dried material or on a gel depending on the analytical method. Material was analysed as a gel in ethanol by cryo-SEM (scanning electron microscope) and cryo-TEM (transmission electron microscopy) and as dried form by IR (infra red spectros-copy) and CP-MAS NMR (cross polarized magic angle spinning nuclear magnetic resonance spectroscopy).

Films for paper coating as described in Examples 3 were made by using a non-dried gel-like material (gel). Films for paper coating as described in Examples 4 using ionic liquid were made by using a non-dried gel-like material (gel) and also the semi-dried gel dried on air.

Part of the gel was dried in the vacuum oven to give a hard solid material. When the water was completely removed from the structure, hydrogen bonds were formed between the individual polymer chains forming larger structural entities, i.e. aggregates. It was found that the gel-like material exhibits better solubility properties than the fully dried material. The gel contained significant amounts of water which make the handling more feasible and hence, this material was used in paper coating studies.

The results of structural investigation were summarized in the following: From the oven dried material a solid state CP-MAS NMR was recorded. It was found, that the Schizophyllan structure is very rigid forming a triple helix structure also visible in XRD (powder X-ray diffraction). This triple helix seems to be almost perfectly rigid up to a molecular weight of 5·10$^5$ g/mol.

This highly regular structure and crystalline packing of the dried material was seen in CP-MAS NMR (cross polarized magic angle spinning NMR) spectrum. Further in CP-MAS NMR spectrum some impurities and other secreted molecules present in the Schizophyllan solution were characterised (e.g. proteins (e.g. hydrophobin) produced by the fungus).

In order to visualize the possible network-like structure of Schizophyllan cryo-TEM and cryo-SEM images were taken from the gel in ethanol. Samples exhibited network-like, porous structure and moreover, aligned long fibrils. The length of the fibrils seems to be well over several hundreds of micrometers with narrow diameter and relative high aspect ratio.

Example 3

Schizophyllan Coating of Paper

A Schizophyllan containing gel, which was prepared as described in Example 2, was applied on regular printing paper and on an uncoated raw paper by using a polymer-film (hydrophobic transfer material), either a Gore-tex® layer or a Teflon® paper.

The following different papers were used as basis paper for Schizophyllan coating:

Basic paper I: raw paper (uncoated paper comprising birch pulp/pine pulp 70:30)

Basic paper II: standard printing paper (coated paper, Future multitech)

The Schizophyllan gel was squeezed between the paper and the film (Gore-tex® or Teflon®) and left to dry. After drying the Gore-tex® or Teflon® films were removed.

A shiny and thin film of Schizophyllan was obtained on the paper surface. In order to investigate the hydrophobic properties of these films, contact angle (CA) as well as time-dependent CAs were measured as described in Example 5 and summarized in Table 1 and FIG. 1.

Furthermore, the obtained, dried film was analyzed by SEM scanning electron microscopy as described in Example 6, wherein the film morphology and thickness were determined.

Example 4

Schizophyllan Coating of Paper Using Compositions Comprising Schizophyllan and Ionic Liquid 1 l of glucan mixed permeat (8.97 g/l glucan) according to Example 1 was diluted 1:1 with water and poured in 2 l ethanol. The precipitate was filtered and pressed. 8.24 g of ethanol-water containing Schizophyllan was dissolved in 412 g of ionic liquid 1-Ethyl-3-methylimidazolium-acetate (EMIM) at 85° C. over night to obtain a solution of about 2% w/w Schizophyllan. Solutions of about 2% w/w Schizophyllan were prepared accordingly using the semi-dried gel-like Schizophyllan material dried in air (see Example 2). The solution was then applied to a PE (polyethylene) plastic film using a blade. The following different blades were used to obtain films:150 μm, 200 μm, 500 μm and 1200 μm.

The PE film with Schizophyllan coating was laid in ethanol in order to dissolve the ionic liquid away from the film. After that the obtained Schizophyllan containing film was transferred to a printing paper, wherein the PE-plastic film was laid on the basic paper (basic paper I and II) with the glucans film on the paper side and the glucan film was transferred to paper by squeezing. The PE-film was removed. The transferred glucan film was dried at room temperature. The resulting Schizophyllan containing film S1 exhibited a thickness of about 4 μm determined by electron microscopy as described in Example 6.

The following different papers were used as basis paper for Schizophyllan coating:
  Basic paper I: raw paper (uncoated paper comprising birch pulp/pine pulp 70:30)
  Basic paper II: standard printing paper (coated paper, Future multitech)

A second Schizophyllan containing film S2 obtained as described about was laid on the first dried film. The resulting Schizophyllan film S2 exhibits a thickness of about 8 μm. Furthermore, coated paper samples were prepared by applying a total of three single films obtained with 200 μm blade. This resulting Schizophyllan film S3 exhibits a thickness of about 12 μm.

Schizophyllan containing films obtained by blade 200 μm/20 cm with thickness of 12 μm (S3) were used for oil penetration tests as described in Example 7.

Furthermore the results of contact angle (CA) measurements obtained of Schizophyllan coatings obtained as described above by blade 200 μm/20 cm with thickness of 4 μm (S1) and 12 μm (S3) were measured as described in Example 5 and summarized in Table 1 and FIG. 1.

Example 5

Contact Angle (CA) Measurements

The hydrophobic stability of the Schizophyllan films on basic paper which were prepared as described in Examples 3 and 4 were measured by time-dependent CA. Three drops of water were placed in a contact with the paper surface resp. the film surface. The contact angles were measured every second for 120 seconds. The measurements were carried out three times. In Table 1 the results of contact angles after 0 sec, 10 sec, 60 sec and 100 sec are summarized. FIG. 1 shows time dependent contact angle (CA).

Further, the time dependent contact angles of the following used basic papers were determined:
  i) Basic paper I: raw paper (uncoated paper comprising birch pulp/pine pulp 70:30)
  ii) Basic paper II: standard printing paper (coated paper, Future multitech)
Front side and back side of standard printing paper (basic paper II) were tested.

It was further found that the contact angle of Schizophyllan coating is nearly the same for both used basic papers I and II.

TABLE 1

Time dependent contact angle

| Sample | Description | Contact angle [°] after 0 sec | after 10 sec | after 60 sec | after 100 sec |
|---|---|---|---|---|---|
| 1 | Basic paper I | 57.5 | — | — | — |
| 2 | Basic paper II, front side | 111.9 | 109.8 | 88.2 | — |
| 3 | Basic paper II, back side | 108.3 | 106.6 | 84.6 | — |
| 4 | Schizophyllan coated paper, applied on basic paper I from ionic liquid as described in Example 4, film thickness 4 μm | 70.2 | 68.6 | 62.0 | 58.5 |
| 5 | Schizophyllan coated paper, applied on basic paper II from ionic liquid as described in Example 4, film thickness 12 μm | 129.1 | 128.0 | 126.8 | 126.0 |
| 6 | Schizophyllan coated paper; applied on basic paper II with Gore-Tex ® film as described in Example 3 | 113.8 | 112.9 | 109.9 | 107.7 |

In case where no contact angle is mentioned the water droplet was already completely absorb from the surface.

The results are further shown in FIG. 1. FIG. 1 shows the time-dependent contact angles (CA) of basic papers and of Schizophyllan coated papers by using water droplets.

Description of FIG. 1:
  x-axis: time t given in seconds (sec)
  y-axis: contact angle CA in relation to water given in ° (degree)
  squares unfilled (□): sample 5
  triangle filled (568 ): sample 6
  lozenge filled (♦) sample 2
  squares filled (■): sample 3
  lozenge unfilled (◇): sample 4
  cross (x): sample 1

Generally, materials with CA values measured against water higher than 100° are regarded as hydrophobic. It is shown that untreated cellulose surface (paper) absorbs water very rapidly as seen in FIG. 1. The curve with cross (x) indicates the contact angles (CA) of uncoated raw paper (basic paper I). The curves with lozenge filled (♦) and squares filled (■) show the time-dependent contact angles (CA) of uncoated printing paper (basic paper II). The initial hydrophobicity of basic paper II is nearly the same as for Schizophyllan coated paper, but the hydrophobicity of the untreated paper decreased dramatically already after 20 seconds. It can be seen that the contact angle of water droplet on surface decreases very quickly and the water droplet is nearly completely adsorbed from the paper surface within a few seconds to maximal 100 sec.

Whereas the hydrophobic properties of different Schizophyllan coated surfaces (indicated by squares unfilled (□), triangle filled (▲) and lozenge unfilled (◇)) remain constant for at least 180 seconds. As it can be seen from the FIG. 1 and Table 1, the contact angle stayed approximately same with minor indication of reduction with time for the Schizophyllan coated paper. The contact angle declined roughly 3° in 60 seconds. This clearly shows the hydrophobic nature of the films.

In order to see the effect of the surface roughness and possible orientation factor, the Schizophyllan films on the papers were mechanically rubbed. After this treatment, CA values were measured again giving approximately same values as before. These results demonstrated the stability of the of the Schizophyllan film against mechanical stress and absence of orientation of Schizophyllan film.

Example 6

Characterization of Schizophyllan Coating on Paper

The morphology of the Schizophyllan coating as obtained according to Example 4 was investigated by scanning electron microscopy (SEM). The Schizophyllan coating was seen as smoother surface with increased film thickness. In sections where the coating was thick, the morphology of this film is very smooth covering the fibrillar structure of uncoated paper fibrils completely. It was clearly seen that Schizophyllan was capable to from a homogeneous film on paper with constant morphology. The morphology of the film explains well the increased hydrophobic nature of the paper as this film functions as a barrier blocking the penetration of water droplets inside the fibrillar structure of paper.

A test piece was cut from the middle of the coated paper. The test piece was embedded in Epofix resin. The first cut of embedded test piece was made at room temperature and imaged using electron microscopy, wherein a scanning electron microscope (SEM), Hitachi 4700, 2 kV was used.

Example 7

Oil Penetration Test

A paper of size 10×10 cm with a grid pattern was placed at the bottom. The barrier coated sample (e.g. Schizophyllan coated paper) was placed with the coating upside on the grid pattern paper. The last layer was a blotting paper of size 10×10 cm.

2 ml oleic acid was applied drop wise on the blotting paper (e.g. with a pipette). The three paper layers were placed together in a drying cabinet at a temperature of 60° C. The stained squares on the lower paper were counted after 1h, 2 h and 16 h at 60° C. The total area of stains was estimated. The results are shown in the Table 2.

TABLE 2

| | Oil penetration test | | |
|---|---|---|---|
| Sample | After 1 h/60° C. | After 2 h/60° C. | After 16 h/ 60° C. |
| Schizophyllan coated paper 12 μm film thickness | No stains | No stains | No stains |
| Basic paper II | Whole area stained | Whole area stained | Whole area stained |

These experiments show that the paper coated with a Schizophyllan layer exhibit an excellent oil-resistance in comparison to untreated papers.

The invention claimed is:

1. A method for coating a sheet-like cellulose containing material comprising applying a composition, comprising at least one glucan (G), which has a β(beta)-1,3-glycosidically linked main chain and at least one side group, having a β(beta)-1,6-glycosidic bond to the main chain, and at least one solvent (S), onto the surface of the sheet-like material.

2. The method according to claim 1, wherein the at least one glucan (G) is Schizophyllan.

3. The method according to claim 1, wherein the composition applied comprises 70 to 99.9% w/w of at least one solvent (S), 0.1 to 30% w/w of at least one glucan (G) and optionally 0 to 15% w/w of at least one further additive (A).

4. The method according to claim 1, wherein the at least one solvent (S) comprises at least one ionic liquid.

5. The method according to claim 1 comprising the following steps:
   a) Preparing a composition comprising at least one glucan (G) and at least one solvent (S);
   b) Applying the composition obtained in step a) onto a sheet-like cellulose containing material by forming a film;
   c) Optionally drying the film.

6. The method according to claim 1, wherein applying the composition onto the sheet-like cellulose containing material is carried out by the following steps:
   b1) Applying the composition comprising at least one glucan (G) and at least one solvent (S) onto a hydrophobic transfer material by forming a film;
   b2) Optionally exposing the film obtained in step b1) to at least one solvent (S),
   b3) Transferring the film obtained in step b2) onto the cellulose containing sheet-like material.

7. The method according to claim 1, wherein the cellulose containing sheet-like material is selected from paper, board, construction paper and cotton fabric, and wherein the coating results in a coating layer having a film-thickness in the range of 1 to 1,000 μm.

8. The method according to claim 1, wherein the composition is applied by using methods selected from dipping, spraying, rolling, squeezing and coating with a blade.

9. A composition comprising:
   i) at least one glucan (G), which has a β(beta)-1,3-glycosidically linked main chain and at least one side group having a β(beta)-1,6-glycosidic bond to the main chain;
   ii) at least one ionic liquid; and
   iii) optionally at least one further additive (A),
wherein the at least one ionic liquid is selected from the group consisting of 1-ethyl-3-methylimidazolium methanesulfonate, 1-butyl-3-methylimidazolium methanesulfonate, methylimidazolium hydrogensulfate, 1-ethyl-3-methylimidazolium hydrogensulfate, 1-butyl-3-methylimidazolium hydrogensulfonate, 1-ethyl-e-methylimidazolium acetate, 1-butyl-3-methylimidazolium acetate, and combinations thereof.

10. The composition according to claim 9, wherein the at least one ionic liquid is selected from 1-ethyl-3-methylimidazolium acetate (EMIM), 1,3-diethylimidazolium acetate and 1-butyl-3-methylimidazolium acetate.

11. The composition according to claim 9, wherein the amount of glucan (G) is in the range of 0.1 to 30% w/w.

12. A coated, sheet-like cellulose containing material comprising a coating layer, which comprises at least one glucan, which has a β(beta)-1,3-glycosidically linked main chain and at least one side group having a β(beta)-1,6-glycosidic bond to the main chain.

13. The coated, sheet-like material according to claim 12, wherein the sheet-like material comprises a coating layer having a thickness in the range of 1 to 1,000 pm.

14. A coated sheet-like cellulose containing material, which comprises a coating layer obtained by the method according to claim 1.

* * * * *